(12) United States Patent
Sukkar

(10) Patent No.: US 8,032,365 B2
(45) Date of Patent: Oct. 4, 2011

(54) METHOD AND APPARATUS FOR CONTROLLING ECHO IN THE CODED DOMAIN

(75) Inventor: Rafid A. Sukkar, Aurora, IL (US)

(73) Assignee: Tellabs Operations, Inc., Naperville, IL (US)

( * ) Notice: Subject to any disclaimer, the term of this patent is extended or adjusted under 35 U.S.C. 154(b) by 1014 days.

(21) Appl. No.: 11/975,419

(22) Filed: Oct. 19, 2007

(65) Prior Publication Data
US 2009/0063142 A1 Mar. 5, 2009

Related U.S. Application Data

(60) Provisional application No. 60/967,197, filed on Aug. 31, 2007.

(51) Int. Cl.
| H04M 9/08 | (2006.01) |
|---|---|
| G06F 15/00 | (2006.01) |
| G10L 21/02 | (2006.01) |
| A61F 11/06 | (2006.01) |
| G10K 11/16 | (2006.01) |
| G10L 21/00 | (2006.01) |

(52) U.S. Cl. ........ 704/228; 704/200; 704/201; 704/226; 379/406.08; 379/406.13; 381/71.1

(58) Field of Classification Search .................. 704/228; 379/406.08
See application file for complete search history.

(56) References Cited

U.S. PATENT DOCUMENTS

| 5,848,151 A * | 12/1998 | Boudy et al. ............. 379/406.13 |
|---|---|---|
| 2002/0184010 A1 | 12/2002 | Eriksson et al. |
| 2004/0076271 A1 | 4/2004 | Koistinen et al. |

FOREIGN PATENT DOCUMENTS

| EP | 1301018 | 4/2003 |
|---|---|---|
| EP | 1432222 | 6/2004 |
| EP | 1544848 | 6/2005 |

(Continued)

OTHER PUBLICATIONS

R. Chandran and D. J. Marchok, "Compressed Domain Noise Reduction and Echo Suppression for Network Speech Enhancement," in *Proc.. 43$^{rd}$ IEEE Midwest Symp. on Circuits and Systems*, pp. 10-13, Aug. 2000.

(Continued)

*Primary Examiner* — Justin Rider
(74) *Attorney, Agent, or Firm* — Hamilton, Brook, Smith & Reynolds, P.C.

(57) ABSTRACT

A method and corresponding apparatus for coded-domain acoustic echo control is presented. An echo control problem is considered as that of perceptually matching an echo signal to a reference signal. A perceptual similarity function that is based on the coded spectral parameters produced by the speech codec is defined. Since codecs introduce a significant degree of non-linearity into the echo signal, the similarity function is designed to be robust against such effects. The similarity function is incorporated into a coded-domain echo control system that also includes spectrally-matched noise injection for replacing echo frames with comfort noise. Using actual echoes recorded over a commercial mobile network, it is shown herein that the similarity function is robust against both codec non-linearities and additive noise. Experimental results further show that the echo-control is effective at suppressing echoes compared to a Normalized Least Mean Squared (NLMS)-based echo cancellation system.

25 Claims, 9 Drawing Sheets

FOREIGN PATENT DOCUMENTS

| WO | WO 0103316 A1 | * | 1/2001 |
|---|---|---|---|
| WO | WO 2006/104692 | | 10/2006 |

OTHER PUBLICATIONS

C. Beaugeant, N. Duetsch, and H. Taddei, "Gain Loss Control Based on Speech Codec Parameters," in *Proc. European Signal Processing Conference*, pp. 409-412, Sep. 2004.

R. A. Sukkar, R. Younce, and P. Zhang, "Dynamic Scaling of Encoded Speech Through the Direct Modification of Coded Parameters," in 2006 Proc. *Int. Conf. on Acoustics, Speech, and Signal Processing (ICASSP)*, pp. 677-680, vol. 1, May 2006.

3GPP2 C.S0014-A, V1.0, "Enhanced Variable Rate Codec, Speech Service Option 3 for Wideband Spread Spectrum Digital Systems," Apr. 2004.

3GPP2 C.S0014-C, Version 1.0, "Enhanced Variable Rate Codec, Speech Service Option 3, 68, and 70 for Wideband Spread Spectrum Digital Systems", Jan. 2007.

* cited by examiner

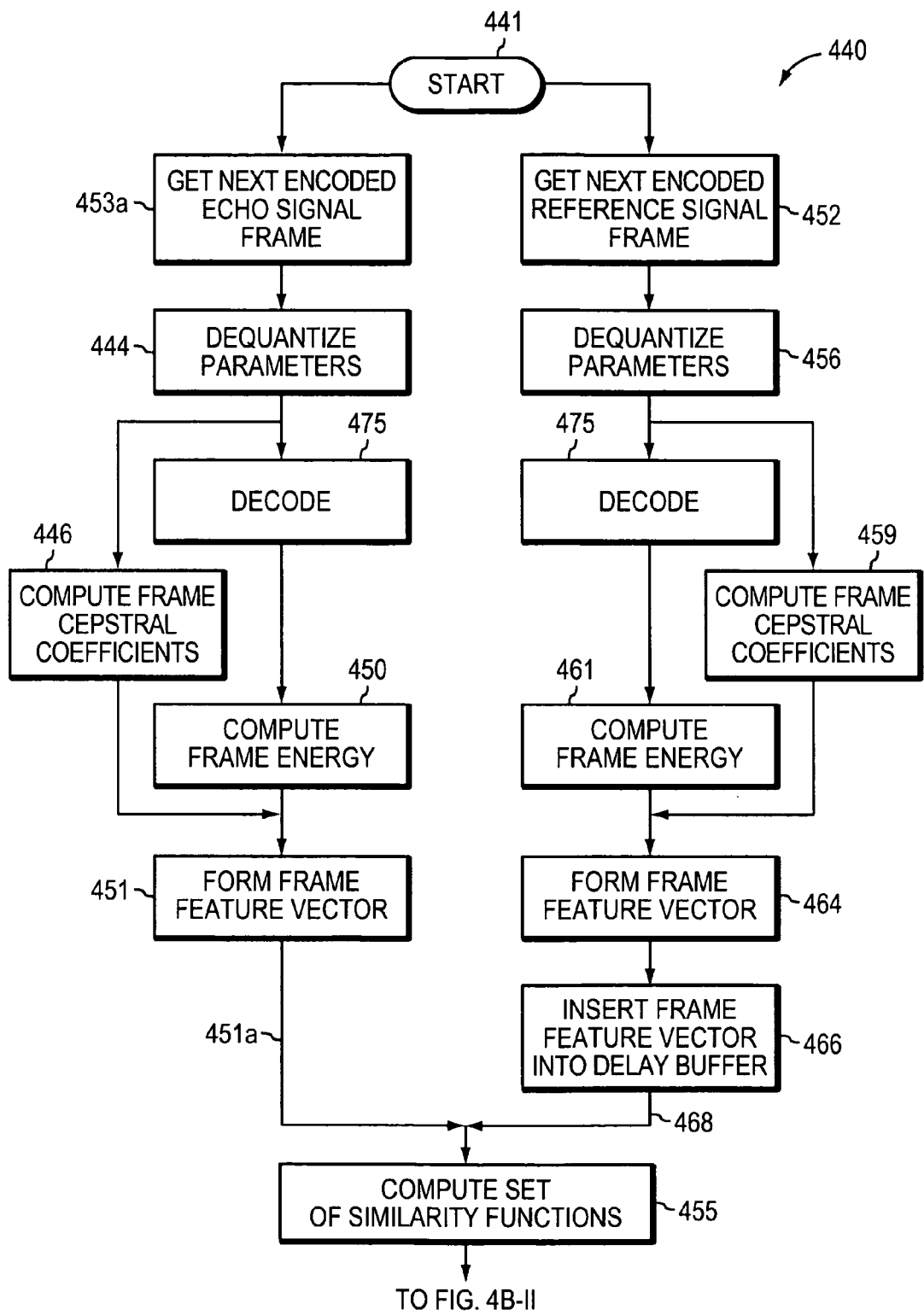
FIG. 4B-I

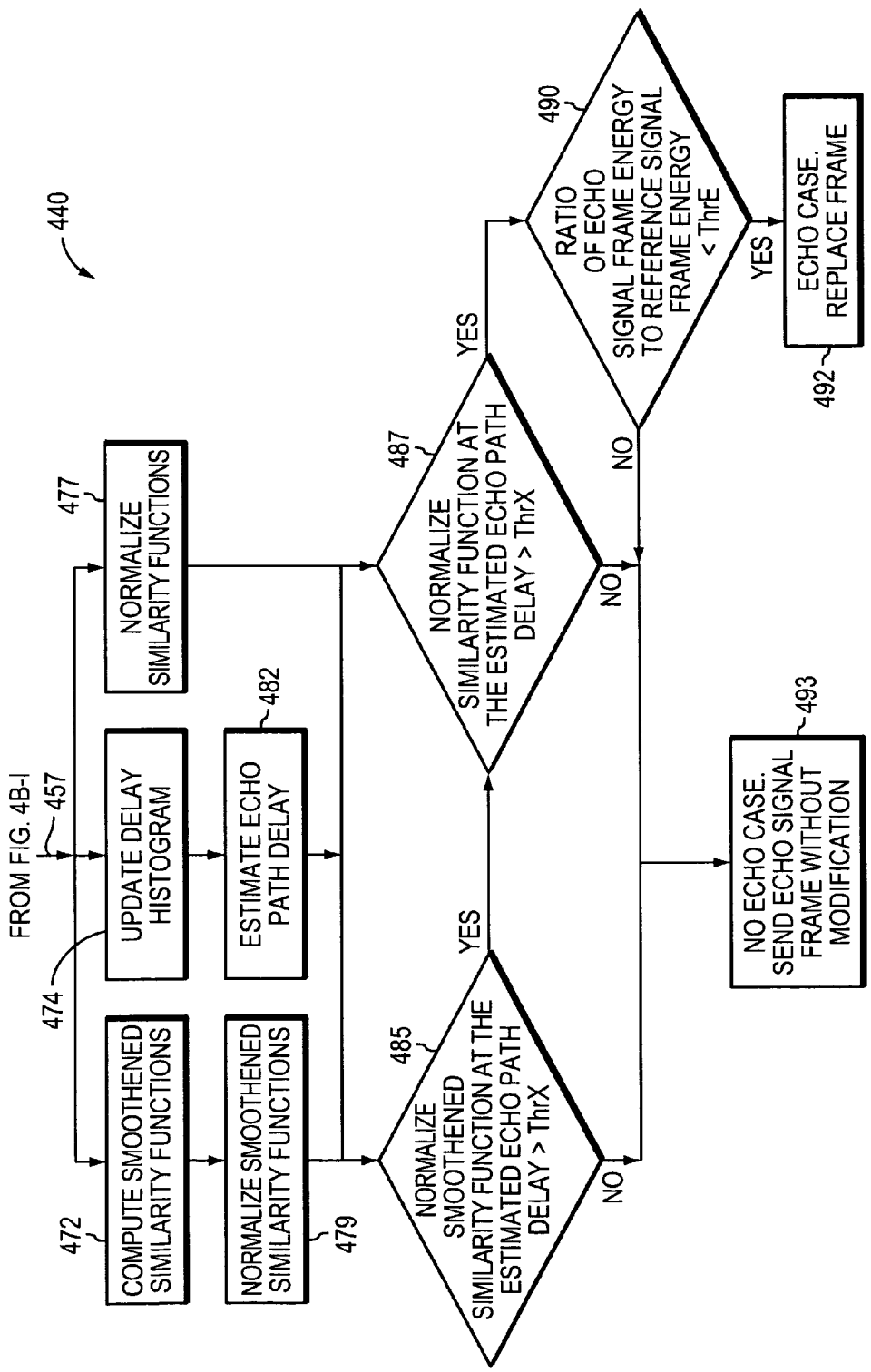
FIG. 4B-II

COMPARISON BETWEEN $g(Y_m, X_{m-i})$ (TOP)
AND $f(Y_m, X_{m-i})$ (BOTTOM)
UNDER DIFFERENT ENR CONDITIONS

COMPARISON BETWEEN THE VARIANCES
OF $g(Y_m, X_{m-i})$ AND $f(Y_m, X_{m-i})$

FROM TOP: DECODED FAR-END SIGNAL, DECODED
NEAR-END SIGNAL, NORMALIZED SIMILARITY FUNCTION,
NON-NORMALIZED SIMILARITY FUNCTION,
ECHO PATH DELAY ESTIMATE

METHOD AND APPARATUS FOR CONTROLLING ECHO IN THE CODED DOMAIN

RELATED APPLICATIONS

This invention claims the benefit of U.S. Provisional Application No. 60/967,197, filed on Aug. 31, 2007, entitled, "Method and Apparatus for Controlling Echo in the Coded Domain," the entire teachings of which are incorporated herein by reference.

BACKGROUND OF THE INVENTION

Speech compression represents a basic operation of many telecommunications networks, including wireless and voice-over-Internet Protocol (VOIP) networks. This compression is typically based on a source model, such as Code Excited Linear Prediction (CELP). Speech is compressed at a transmitter based on the source model and then encoded to minimize valuable channel bandwidth that is required for transmission. In many newer generation networks, such as Third Generation (3G) wireless networks, the speech remains in a Coded Domain (CD) (i.e., compressed) even in a core network and is decompressed and converted back to a Linear Domain (LD) at a receiver. This compressed data transmission through a core network is in contrast with cases where the core network has to decompress the speech in order to perform its switching and transmission. This intermediate decompression introduces speech quality degradation. Therefore, new generation networks try to avoid decompression in the core network if both sides of the call are capable of compressing/decompressing the speech.

In many networks, especially wireless networks, a network operator (i.e., service provider) is motivated to offer a differentiating service that not only attracts customers, but also keeps existing ones. A major differentiating feature is voice quality. So, network operators are motivated to deploy in their network Voice Quality Enhancement (VQE). VQE includes: acoustic echo suppression, noise reduction, adaptive level control, and adaptive gain control.

Echo cancellation, for example, represents an important network VQE function. While wireless networks do not suffer from electronic (or hybrid) echoes, they do suffer from acoustic echoes due to an acoustic coupling between the ear-piece and microphone on an end user terminal. Therefore, acoustic echo suppression is useful in the network.

In the older generation networks, where the core network decompresses a signal into the linear domain followed by conversion into a Pulse Code Modulation (PCM) format, such as A-law or μ-law, in order to perform switching and transmission, network-based VQE has access to the decompressed signals and can readily operate in the linear domain. (Note that A-law and μ-law are also forms of compression (i.e., encoding), but they fall into a category of waveform encoders. Relevant to VQE in a coded domain is source-model encoding, which is a basis of most low bit rate, speech coding.) However, when voice quality enhancement is performed in the network where the signals are compressed, there are basically two choices: a) decompress (i.e., decode) the signal, perform voice quality enhancement in the linear domain, and re-compress (i.e., re-encode) an output of the voice quality enhancement, or b) operate directly on the bit stream representing the compressed signal and modify it directly to effectively perform voice quality enhancement. The advantages of choice (b) over choice (a) are three fold:

First, the signal does not have to go through an intermediate decode/re-encode, which can degrade overall speech quality. Second, since computational resources required for encoding are relatively high, avoiding another encoding step significantly reduces the computational resources needed. Third, since encoding adds significant delays, the overall delay of the system can be minimized by avoiding an additional encoding step.

Performing VQE functions or combinations thereof in the compressed (or coded) domain, however, represents a more challenging task than VQE in the decompressed (or linear) domain.

SUMMARY OF THE INVENTION

A method and corresponding apparatus according to an example embodiment of the invention controls echo in the coded domain. Similarity of coded near end and far end signals is computed as a function of cepstral coefficients. Echo is detected, if any, based on the similarity, and the coded near end signal is transmitted in an adjusted state in an event echo is detected in the near end signal.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 4B-I and 4B-II illustrate a detailed flow diagram of an example embodiment of the present invention;

FIG. 4B is a detailed flow diagram of an example embodiment of the present invention;

FIG. 4C is a block diagram corresponding to the flow diagram of FIG. 4A; and

DETAILED DESCRIPTION OF THE INVENTION

Figure 1:
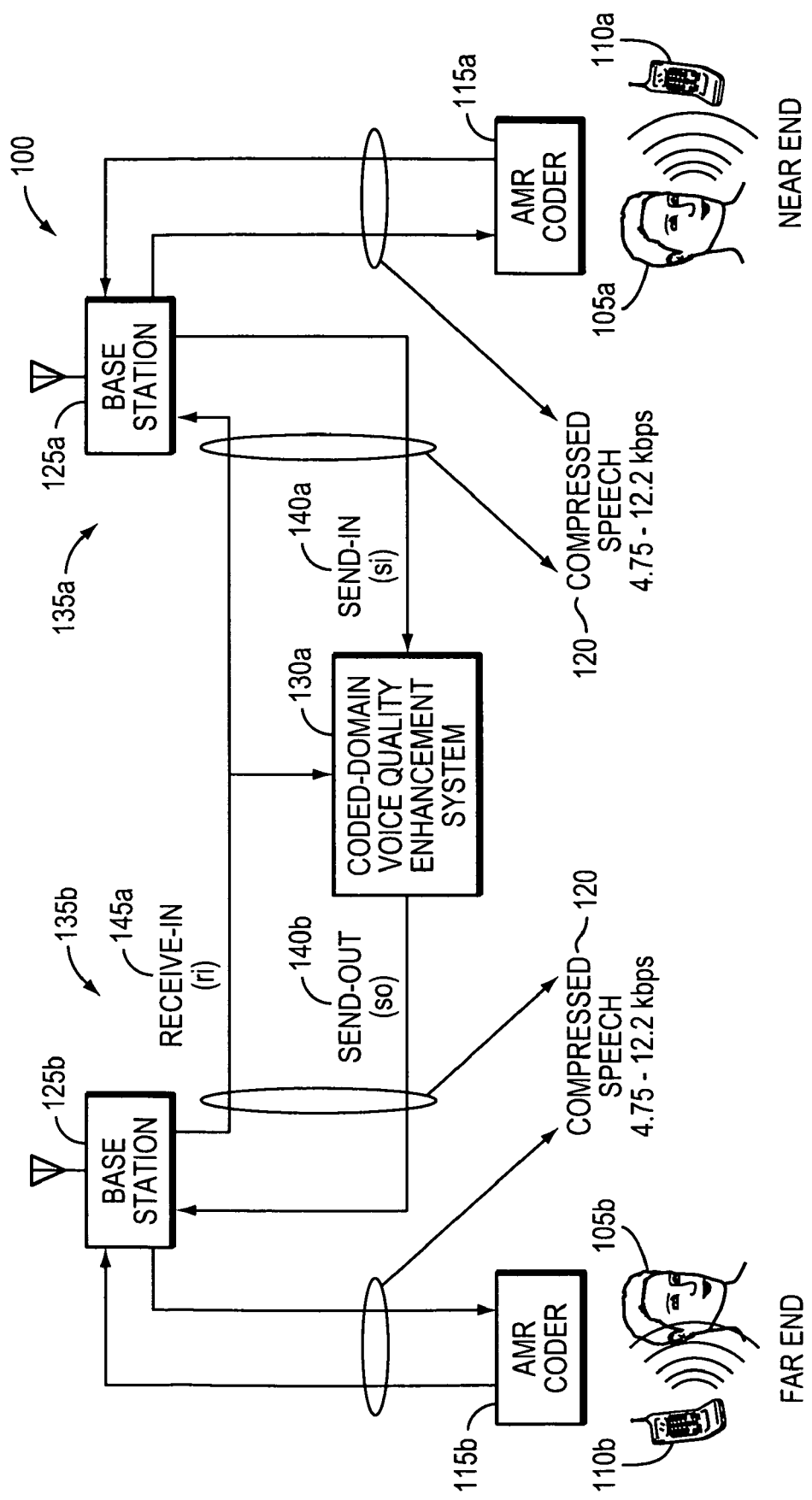
FIG. 1 is a network diagram in which an example embodiment of the present invention may be deployed.

A description of example embodiments of the invention follows.

Transcoder Free Operation (TrFO) represents an integral feature of $3^{rd}$ Generation (3G) mobile networks, as well as future VoIP networks. In TrFO, voice signals remain encoded in their native encoding format (e.g., Adaptive Multi-rate (AMR), Enhanced Variable Rate Coded (EVRC), etc.) throughout the core network and are only decoded at the endpoints. Therefore, if TrFO is to be maintained, any network-based echo control system must operate on the coded stream without a decode/re-encode operation.

Because of its infancy, only a few coded-domain methods have been proposed (R. Chandran and D. J. Marchok, "Compressed Domain Noise Reduction and Echo Suppression for Network Speech Enhancement," in Proc. 43rd IEEE Midwest Symp. on Circuits and Systems, pp. 10-13, August 2000; C. Beaugeant, N. Duetsch, and H. Taddei, "Gain Loss Control Based on Speech Codec Parameters," in Proc. European Signal Processing Conference, pp. 409-412, September 2004; and R. A. Sukkar, R. Younce, and P. Zhang, "Dynamic Scaling of Encoded Speech Through the Direct Modification of Coded Parameters," in 2006 Proc. Int. Conf. on Acoustics, Speech, and Signal Processing (ICASSP), pp. 677-680, Vol. 1, May 2006). In these methods echo control is performed in two stages. The first is an echo detection stage leading to the second stage of attenuating the detected echoes by modifying the coded parameters directly without a re-encoding stage. In R. Chandran and D. J. Marchok, "Compressed Domain Noise Reduction and Echo Suppression for Network Speech Enhancement," in Proc. 43rd IEEE Midwest Symp. on Circuits and Systems, pp. 10-13, August 2000; and R. A. Sukkar, R. Younce, and P. Zhang, "Dynamic Scaling of Encoded Speech Through the Direct Modification of Coded Parameters," in 2006 Proc. Int. Conf. on Acoustics, Speech, and Signal Processing (ICASSP), pp. 677-680, Vol. 1, May 2006, echo detection is performed by a full or partial decoding of the far-end (reference) signal and the near-end (echo) signal, enabling the use of traditional linear-domain echo detection methods. In C. Beaugeant, N. Duetsch, and H. Taddei, "Gain Loss Control Based on Speech Codec Parameters," in Proc. European Signal Processing Conference, pp. 409-412, September 2004, echo detection is based on comparing estimated energy levels of the far-end and the near-end signals.

Coded-domain echo control must be robust to both codec non-linearities and environmental noise conditions. In this work, a perceptual approach to the echo detection stage is employed, taking advantage of the spectral information available in the coded parameters themselves. The approach is based on the fact that if audible echoes are present, then the near-end signal is perceptually similar to a delayed, scaled version of the far-end signal. If echo is detected, then coded-domain attenuation (R. A. Sukkar, R. Younce, and P. Zhang, "Dynamic Scaling of Encoded Speech Through the Direct Modification of Coded Parameters," in 2006 Proc. Int. Conf. on Acoustics, Speech, and Signal Processing (ICASSP), pp. 677-680, Vol. 1, May 2006) or full frame replacement with comfort noise is applied.

Coded Domain Voice Quality Enhancement

A method and corresponding apparatus for performing Voice Quality Enhancement (VQE) directly in the coded domain using an example embodiment of the present invention is presented below. As should become clear, no intermediate decoding/re-encoding is performed, thereby avoiding speech degradation due to tandem encodings and also avoiding significant additional delays.

FIG. 1 is a block diagram of an example of a network 100 that includes a Coded Domain VQE (CD-VQE) system 130a. For simplicity, the CD-VQE system 130a is shown on only one side of a call with an understanding that CD-VQE can be performed on both sides. The one side of the call is referred to herein as the near end 135a, and the other side of the call is referred to herein as the far end 135b.

In FIG. 1, the CD-VQE system 130a is performed on a send-in signal (si) 140a generated by a near end user 105a using a near end wireless telephone 110a. A far end user 105b using a far end telephone 110b communicates with the near end user 105a via the network 100. In this example network, a near end Adaptive Multi-Rate (AMR) coder 115a and a far end AMR coder 115b are employed to perform encoding/decoding in the telephones 115a, 115b. A near end base station 125a and a far end base station 125b support wireless communications for the telephones 110a, 110b, including passing through compressed speech 120. Another example includes a network 100 in which the near end wireless telephone 110a may also be in communication with a base station 125a, which is connected to a media gateway (not shown), which in turn communicates with a conventional wireline telephone or Public Switched Telephone Network (PSTN).

In FIG. 1, a receive-in signal, ri, 145a, send-in signal, si, 140a, and send-out signal, so, 140b are bit streams representing the compressed speech 120. Focus herein is on the CD-VQE system 130a operating on the send-in signal, si, 140a. Another example is a network that uses EVRC instead of AMR coding.

The CD-VQE method and corresponding apparatus disclosed herein is, by way of example, directed to a family of speech coders based on Code Excited Linear Prediction (CELP). According to an example embodiment of the present invention, an Adaptive Multi-Rate (AMR) set of coders and EVRC are considered examples of CELP coders. However, the method for the CD-VQE disclosed herein is directly applicable to all coders based on CELP. Coders based on CELP can be found in both mobile phones (i.e., wireless phones) as well as wireline phones operating, for example, in a Voice-over-Internet Protocol (VOIP) network. Therefore, the method for CD-VQE disclosed herein is directly applicable to both wireless and wireline communications.

Typically, a CELP-based speech encoder, such as the AMR family of coders, segments a speech signal into frames of 20 msec. in duration. Further segmentation into subframes of 5 msec. may be performed, and then a set of parameters may be computed, quantized, and transmitted to a receiver (i.e., decoder). If m denotes a subframe index, a synthesizer (decoder) transfer function is given by $$D_m(z) = \frac{S(z)}{C_m(z)} = \frac{g_c(m)}{[1 - g_p(m)z^{-T(m)}]\left[1 - \sum_{i=1}^{P} a_i(m)z^{-i}\right]} \quad (1)$$

where S(z) is a z-transform of the decoded speech, and the following parameters are the coded-parameters that are computed, quantized, and sent by the encoder:

$g_c(m)$ is the fixed codebook gain for subframe m,
$g_p(m)$ is the adaptive codebook gain for subframe m,
T(m) is the pitch value for subframe m,
$\{a_i(m)\}$ is the set of P linear predictive coding parameters for subframe m, and
$C_m(z)$ is the z-transform of the fixed codebook vector, $c_m(n)$, for subframe m.

Figure 2:
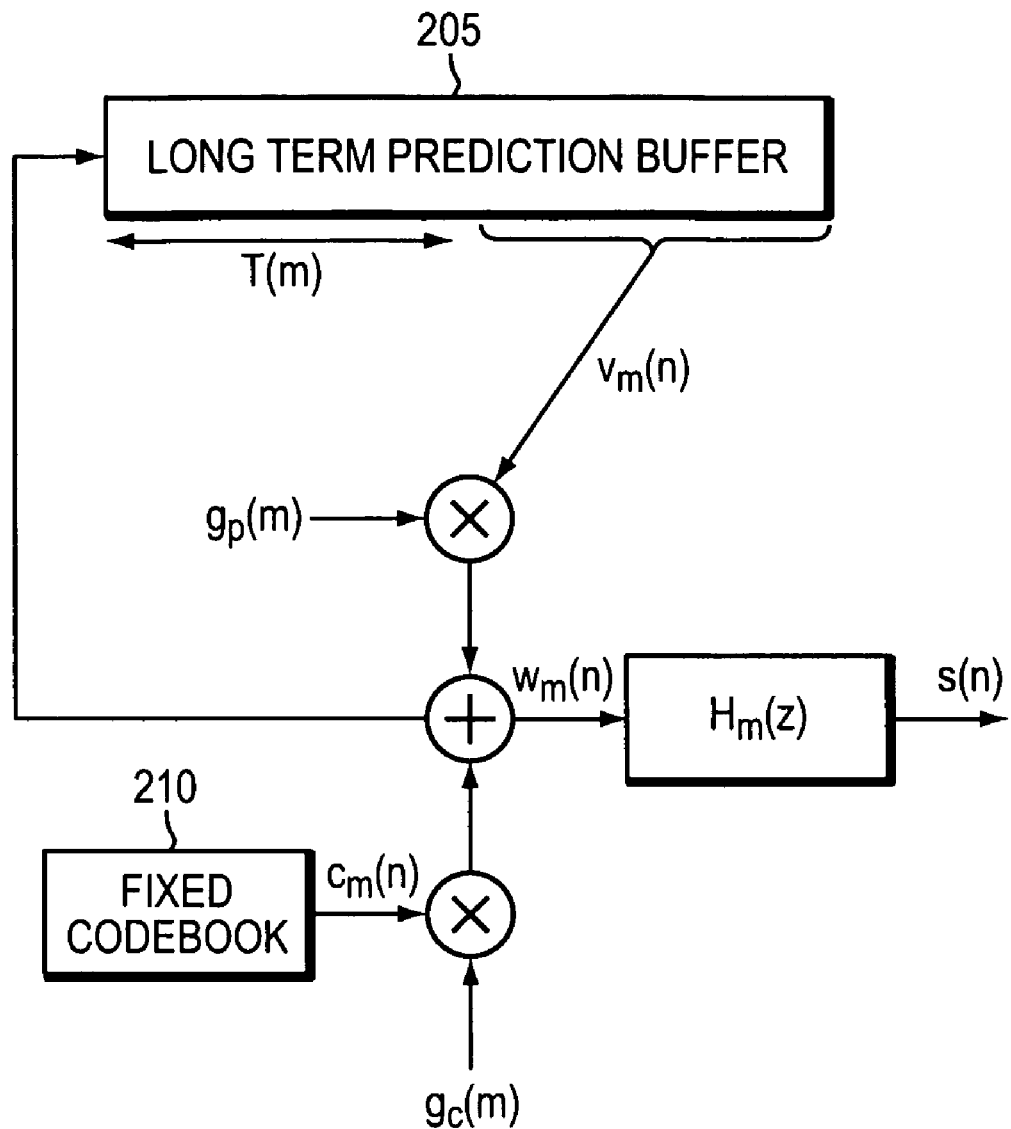
FIG. 2 is a block diagram of a synthesizer used to generate coded domain signals that are transmitted in the network of FIG. 1.

FIG. 2 is a block diagram of a synthesizer used to perform the above synthesis.

The synthesizer includes a long term prediction buffer 205, used for an adaptive codebook, and a fixed codebook 210, where $v_m(n)$ is the adaptive codebook vector for subframe m,
$w_m(n)$ is the Linear Predictive Coding (LPC) excitation signal for subframe m, and
$H_m(z)$ is the LPC filter for subframe m, given by $$H_m(z) = \frac{1}{1 - \sum_{i=1}^{P} a_i(m)z^{-i}} \quad (2)$$

Based on the above equation, one can write $$s(n)=w_m(n)*h_m(n) \quad (3)$$

where $h_m(m)$ is the impulse response of the LPC filter, and $$w_m(n)=g_p(m)v_m(n)+g_c(m)c_m(n) \quad (4)$$

Figure 3:
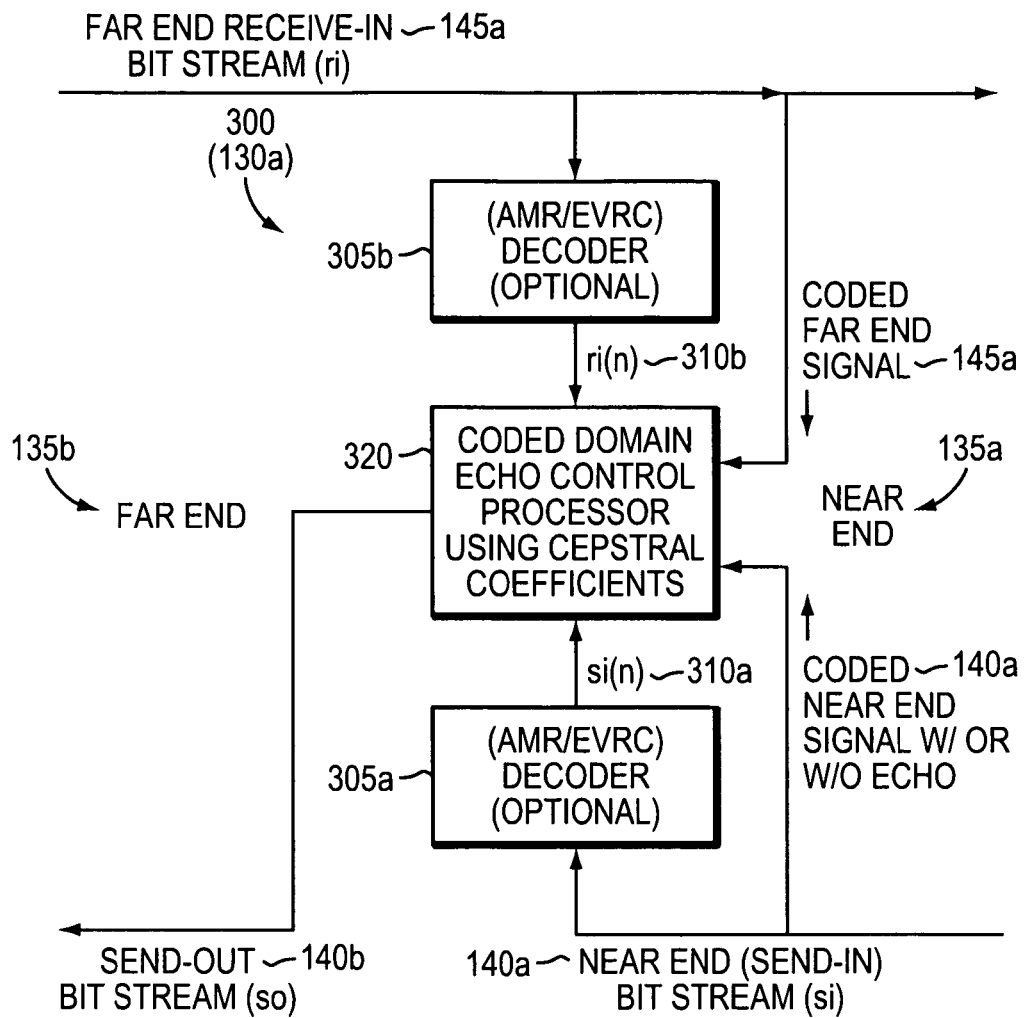
FIG. 3 is a block diagram of an example embodiment of a coded domain voice quality enhancement (CD-VQE) system used to control echo.

FIG. 3 is a block diagram of an example embodiment of a CD-VQE system 300 that can be used to implement the CD-VQE system 130a introduced in FIG. 1. Specifically, FIG. 3 is a high level block diagram of the approach taken. In this figure, only the near-end side 135a of the call is shown, where VQE is performed on the send-in bit stream, si, 140a. The send-in and receive-in bit streams 140a, 145a are received by a Coded Domain Echo Control Processor 320, also referred to herein as a CD-VQE system 320, and, optionally decoded by AMR or EVRC decoders 305a, 305b into the linear domain, si(n) and ri(n) signals 310a, 310b, respectively, and then passed through the CD-VQE processor 320 to be used in determining whether echo is in the near end signal 140a and whether to reduce or remove the echo if so. The CD-VQE processor 320 adjusts appropriate parameters in the si bit stream 140a to perform VQE, which, in this case, is echo control.

It should be understood that the decoding 305a, 305b can be a partial decoding of the two signals 140a, 145a. Although the si signal 140a is decoded into the linear domain, there is no intermediate decoding/re-encoding that can degrade the speech quality. Rather, the decoded signal 310a is used to extract relevant information that aids the CD-VQE processor 320 and is not re-encoded after the CD-VQE processor 320. Decoding may be done using available decoding methods in the art. In this embodiment, decoding was performed using the EVRC codec standard (3GPP2 C.S0014-C, Version 1.0, "Enhanced Variable Rate Codec, Speech Service Option 3, 68, and 70 for Wideband Spread Spectrum Digital Systems", January 2007).

The following description refers to example operations occurring in the coded domain echo control processor 320. The operations may be executed in hardware, firmware, or software. If executed in software, the software may be in any form of software suitable for executing in accordance with example embodiments disclosed herein and loaded and executed by one or multiple general purpose or application specific processors, also suitable for operating in accordance with the example embodiments disclosed herein.

Echo Detection Approach

The spectral information that is part of the encoded signal parameters is used to define a perceptual similarity measure between the near-end signal and a delayed version of the far-end signal. In R. A. Sukkar, "Echo Detection and Delay Estimation Using A Pattern Recognition Approach and Cepstral Correlations," in 2007 Proc. Int. Conf. on Acoustics, Speech, and Signal Processing (ICASSP), pp. 909-912, Vol. 4, April 2007, an echo detection method is presented where a similarity function is defined employing weighted cepstral correlations between the current frame of the near-end signal and a delayed frame of the far-end signal:

$$f(Y_m, X_{m-i})=|X_{m-i}|r(Y_m, X_{m-i}). \quad (5)$$

Here $Y_m$ represents the feature vector for the current frame, m, of the near-end signal, $X_{m-i}$ is the feature vector for frame m–i, $i \geqq 0$ of the far-end signal, and $r(Y_m, X_{m-i})$ is the correlation coefficient between $Y_m$ and $X_{m-i}$. A delay line buffer of L bins is maintained to store the feature vectors of the previous L frames of the far-end signal. The value of L depends on the largest echo path delay that is to be expected. If an audible echo is present in the near-end signal, then the similarity function between a frame of the near-end signal and the frame in the delay line bin corresponding to the actual echo path delay will consistently exhibit a larger value compared to the other similarity function values for the rest of the delay line bins. A short or long term average of $f(Y_m, X_{m-i})$ across the index m, when plotted as a function of the index i, $1 \leqq i \leqq L$, exhibits a peak at the index corresponding to the echo path delay.

It was argued in R. A. Sukkar, "Echo Detection and Delay Estimation Using A Pattern Recognition Approach and Cepstral Correlations," in 2007 Proc. Int. Conf. on Acoustics, Speech, and Signal Processing (ICASSP), pp. 909-912, Vol. 4, April 2007, that this approach can be related to speech recognition in that each bin in delay line can be viewed as corresponding to a word or phrase in the recognizer vocabulary set. Similar to speech recognition, partial or cumulative score of the similarity function across time is used to determine if there is a word match (i.e., echo), and if so, what word (i.e., echo path delay) is present.

In speech recognition, the feature vector typically consists of cepstral coefficients, delta cepstrals, and delta-delta cepstrals. These are the features that are also used in R. A. Sukkar, "Echo Detection and Delay Estimation Using A Pattern Recognition Approach and Cepstral Correlations," in 2007 Proc. Int. Conf. on Acoustics, Speech, and Signal Processing (ICASSP), pp. 909-912, Vol. 4, April 2007. However, the use of the dynamic delta and delta-delta features requires knowledge of future frames of the near-end signal, implying that a significant processing delay would be incurred. To minimize processing delay, as would be required for a network-based coded-domain echo control, the example embodiments disclosed herein avoid using dynamic features. Instead, neighboring frame information is incorporated by defining the feature vector to include the cepstral coefficients of the current frame concatenated with the cepstral coefficients of N previous frames. The cepstral features are computed directly from the spectral parameters of the encoded signal. Generally, the encoded parameters include spectral information in the form of LPC Line Spectral Pairs (LSP's.) (e.g., AMR-NB (3GPP TS 26.090, V6.0.0, "Adaptive Multi-Rate (AMR) speech codec," December 2004) and EVRC (3GPP2 C.S0014-A, V1.0, "Enhanced Variable Rate Codec, Speech Service Option 3 for Wideband Spread Spectrum Digital Systems," April 2004)). These LSP's are transformed to cepstral coefficients, where the first cepstral coefficient is discarded, and the next 10 coefficients are used. They are then "liftered" (i.e., "filtered" as applied to cepstrais) to normalize their variance using a simple lifter (B. H. Juang, L. R. Rabiner, and J. G. Wilpon, "On the Use of Bandpass Liftering in Speech Recognition," IEEE Trans. Acoust., Speech, and Signal Processing, pp. 947-954, Vol. 32, July 1987):

$$C'(m)=kC(m), \quad (6)$$

where C(m) and C'(m) are the cepstral and liftered cepstral coefficients, respectively. In this work, set N=1, resulting in a $20^{th}$ dimensional feature vector consisting of the liftered cepstral coefficients for the current frame concatenated with the coefficients of the previous frame.

In the speaker verification arena, it was found that cohort normalization of the verification score results in more discriminative and robust measure for making the classification decision (A. E. Rosenberg, J. Delong, C.-H. Lee, B.-H. Juang, and F. K. Soong, "The Use of Cohort Normalized Scores for Speaker Verification," Proc. 1992 ICSLP, Vol. 1, pp. 599-602, 1992). Similar conclusions were found in speech recognition. In this work, the notion of cohort normalization is extended to the echo detection problem. A new similarity function is defined by cohort normalizing the similarity function of equation (1) as follows:

$$g(Y_m, X_{m-i}) = f(Y_m, X_{m-i}) - f(Y_m, X_{m-j}), 1 \leq i \leq L, \quad (7)$$

where $$j = \arg\max_i f(Y_m, X_{m-i}), 1 \leq i \leq L. \quad (8)$$

Here the cohort score is the maximum value of the similarity function over all the delay bins for a given near-end signal frame. Note that $g(Y_m, X_{m-i}) \leq 0$. In the ideal case, $g(Y_m, X_{m-i})$ will always assume its maximum value of zero at index i corresponding to the true echo path delay for all echo segments. In practice, echo segments result in $g(Y_m, X_{m-i})$ having a variance around a mean that is close to zero. However, the variance at the true echo path delay index is much lower than that of $f(Y_m, X_{m-i})$ across various conditions. This makes $g(Y_m, X_{m-i})$ a more robust measure for echo detection. To reduce further the variance of $g(Y_m, X_{m-i})$ during echo segments, a smoothed version of $f(Y_m, X_{m-i})$ is also normalized, as follows:

$$g_s(Y_m, X_{m-i}) = f_s(Y_m, X_{m-i}) - f_s(Y_m, X_{m-k}), 1 \leq i \leq L, \quad (9)$$

where $$f_s(Y_m, X_{m-i}) = \alpha f_s(Y_m, X_{m-i}) + (1-\alpha)f(Y_m, X_{m-i}), \quad (10)$$

$$k = \arg\max_i f_s(Y_m, X_{m-i}), 1 \leq i \leq L, \quad (11)$$

and $\alpha$ is a constant set to 0.9. Echo detection is then performed by comparing $g(Y_m, X_{m-i})$ and $g_s(Y_m, X_{m-i})$ to thresholds where i is set equal to the index corresponding to an estimated echo path delay.

Echo Path Delay Estimation

The echo path delay index is estimated by applying a ranked statistics-type approach. For a given call, the history of echo delays is considered by maintaining a histogram of the delay indices that maximize the frame's $f(Y_m, X_{m-i})$. However, instead of incrementing the histogram bin by 1, the bin may be incremented by a weighted value of the maximum similarity function:

$$H_m(j) = H_{m-i}(j) + \lambda f(Y_m, X_{m-i}), \quad (12)$$

where j is given in equation (4), $H_m(j)$, $1 \leq j \leq L$, is the state of the histogram at frame m, and $\lambda$ is a constant set to 10. Therefore, the histogram may be biased towards the indices associated with larger maximums of $f(Y_m, X_{m-i})$. The echo path delay index for frame m is then estimated as $$i_m^* = \arg\max_i H_m(i), 1 \leq i \leq L. \quad (13)$$

The corresponding echo path delay can then be given as:

$$\hat{d}_m = D \cdot i_m^* \quad (14)$$

where D is the frame duration.

Coded-Domain Comfort Noise Injection

In at least one example embodiment, a strategy of replacing frames classified as containing echo with comfort noise that is matched to the near-end background noise is adopted. An important aspect of comfort noise injection is to determine a good estimate of the near-end background noise. Fortunately, the strategies employed by the different codecs for discontinuous transmission and silence suppression can be used for this purpose. For the AMR-NB codec case, the background noise parameters can be estimated in the same way the codec estimates the background noise parameters for silence suppression and noise injection. However, if silence suppression is not turned on, then a voice activity detector on a fully or partially decoded signal may need to be employed.

In this example embodiment, the EVRC codec is used. For EVRC, the rate that the codec uses to encode the individual frames is employed. The EVRC codec typically encodes silence and background noise frames at the $1/8^{th}$ rate. A buffer of K previous frames that were encoded at the $1/8^{th}$ rate is kept. In this example, K=12. Then, when a replacement frame is needed, a frame is chosen at random from the buffer and replaces the parameters of the echo frame with the parameters of the randomly chosen background noise frame. However, there is one exception. EVRC does not allow the transition from full rate to $1/8^{th}$ rate without a transitional $1/2$ rate frame in between. So, if the previous frame is encoded at the full rate and the current frame is to be replaced by background noise, the randomly chosen $1/8^{th}$ rate frame is de-quantized and re-quantized using $1/2$ rate. In this case, the fixed codebook index is chosen at random within the allowed range of $1/2$ rate. The adaptive codebook gain is set to zero and the fixed codebook gain is set to a value such that the energy of the fixed codebook equals the energy parameter of the $1/8^{th}$ rate frame. This fixed codebook gain is then quantized with $1/2$ rate tables.

In the view of the foregoing, the following description illustrates example embodiments and features that may be incorporated into a system for controlling echo in the coded domain, where the term "system" may be interpreted as a system, a subsystem, apparatus, method or any combination of thereof. For example, in order to control echo in the coded domain, a system may compute the similarity of coded near end and far end signals as a function of cepstral coefficients. Subsequently, the system may perform echo detection based on the computed similarity of coded near end and far end signals. In an event the presence of echo is detected, the system may transmit the coded near end signal in an adjusted state.

The system may compute the cepstral coefficients directly from coded parameters by transforming line spectral pairs into cepstral coefficients.

In order to compute the similarity of coded near end and far end signals, the system may compute factors such as present set of similarity functions, present set of normalized similarity functions, present set of smoothened similarity functions, and present set of normalized smoothened similarity functions. The system may compute the present set of similarity functions as a function of the present coded near end signal frame and present and previous coded far end signal frames. Additionally, the system may compute the present set of normalized similarity functions as a function of the computed similarity functions. The system may also compute the present set of smoothened similarity functions as a function of the computed similarity functions. Furthermore, the system may compute the present set of normalized smoothened similarity functions as a function of the computed smoothened similarity functions.

In order to detect possible echo, the system may determine a delay of a possible echo in the present coded near end speech frame based on the present and previous sets of similarity functions. Additionally, the system may compare a given present normalized similarity function corresponding to the delay to a first threshold and a given present normalized smoothened similarity function corresponding to the delay to a second threshold to determine whether the present coded near end signal frame contains echo.

In order to compute the set of similarity functions, the system may employ weighted cepstral correlations between the present near end signal frame and present and previous far end signal frames.

The system may compute the present set of normalized similarity functions based on determining the maximum valued similarity function among the present set of similarity functions and normalizing the present set of similarity functions based on the maximum value of the similarity functions.

The system may compute the present set of smoothened similarity functions based on calculating a present smoothened similarity function. In order to calculate the present smoothened similarity function, the system may compute a weighted sum of previous smoothened similarity functions and a present similarity function.

In order to compute the present set of normalized smoothened similarity functions, the system may determine a maximum valued smoothened similarity function among the present set of smoothened similarity functions and normalize this present set of smoothened similarity functions based on the maximum value of the smoothened similarity functions.

The system, in order to determine whether the present coded near end signal frame includes echo, may compare the present set of normalized similarity functions and the normalized, smoothened, similarity functions to respective thresholds at the index of the functions corresponding to an estimated echo path delay.

In order to detect the presence of echo, the system may estimate an echo path delay index by maintaining a histogram of delay indices that maximize a similarity function representing a frame within the coded near end and far end signals. Subsequently, the system may increment bins within the delay histogram by a weighted value of a maximum similarity function to bias the histogram towards indices associated with larger maximums of the similarity function. The system may report the estimated echo path delay based on the histogram index whose bin has the largest value.

The system may partially decode the near end and far end signals. In such case, the system may determine a state of energy loss based on whether the near end signal is within an expected energy loss compared to energy of the far end signal associated with echo. In order to detect the echo more accurately than using the similarity alone, the system may benefit from this additional information by employing the state of energy loss as well as the similarity measure.

In an event the presence of an echo is detected, the system may replace parameters of frames in the coded near end signal detected to contain echo with the parameters in a state that reduces or removes the echo.

In an event the presence of an echo is detected, the system may replace parameters of frames in the coded near end signal detected to contain echo with the parameters in a state of comfort noise.

The system, in a network employing EVRC system, may replace a frame detected to have echo with a frame randomly chosen from among previously detected and stored ⅛ rate encoded frames. In an event the frame detected with echo follows a frame encoded at full rate, the system may dequantize a randomly chosen previously detected and stored ⅛ rate encoded frame, requantize the dequantized frame as a requantized ½ rate encoded frame, and replace the frame detected with echo with the requantized ½ rate encoded frame. Dequantization and requantization may be done using available dequantization methods in the art. In this embodiment, dequantization and requantization were performed using the EVRC codec standard (3GPP2 C.S0014-C, Version 1.0, "Enhanced Variable Rate Codec, Speech Service Option 3, 68, and 70 for Wideband Spread Spectrum Digital Systems", January 2007).

Figure 4A:
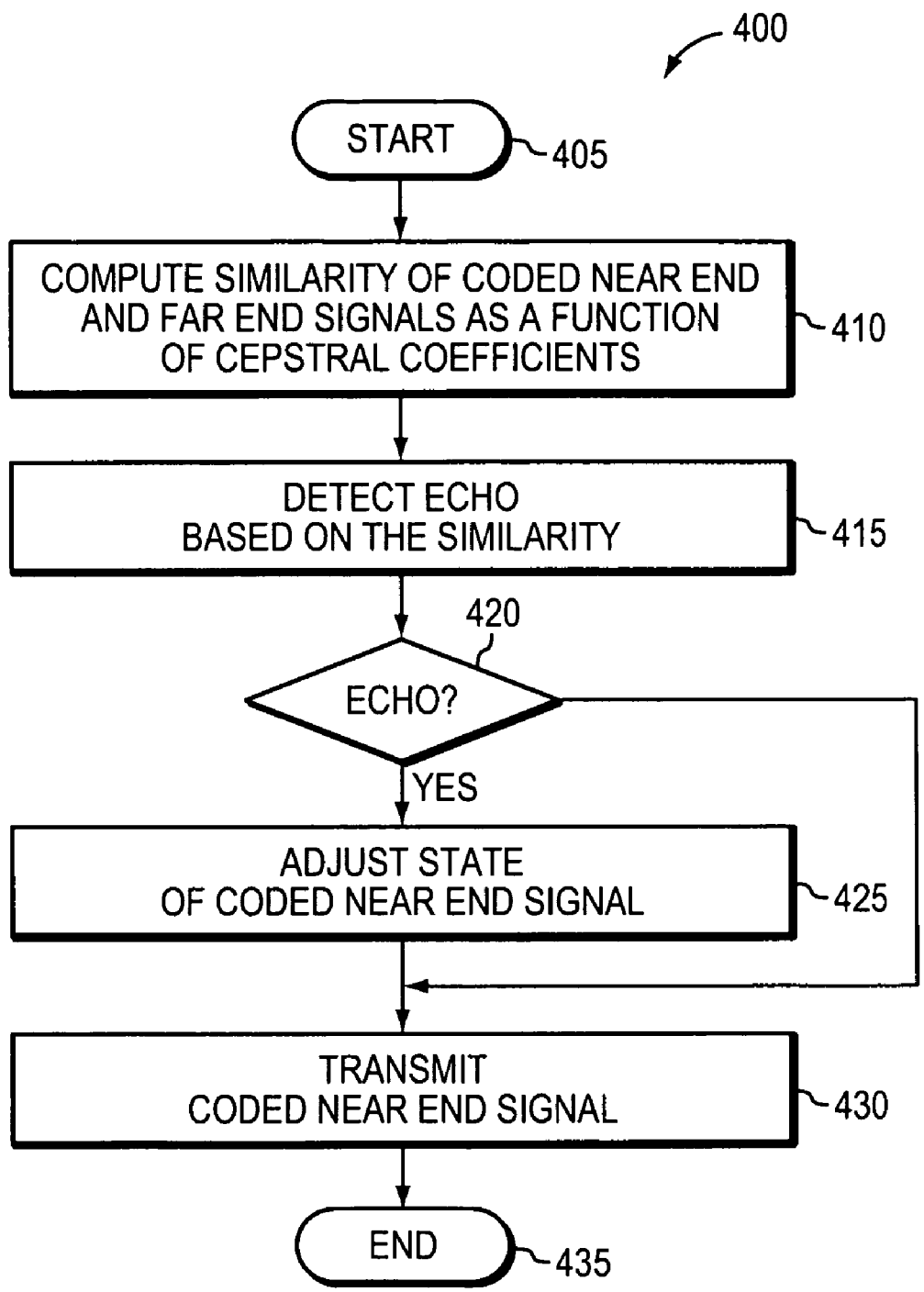
FIG. 4A is a high level flow diagram of an example embodiment of the present invention.

FIG. 4A is a flow diagram 400 illustrating an example embodiment of the present invention. The flow diagram 400 starts (405) and computes similarity (410) of coded near end and far end signals as a function of cepstral coefficients. The flow diagram then detects echo (415) based on the similarity. In the case of no echo (420), the flow diagram 400 transmits (430) the coded near end signal in an unaltered state and then ends (435). In the case of echo (420), the flow diagram 400 adjusts a state (425) of the coded near end signal, transmits (430) the coded near end signal in an adjusted state, and then ends (435). Adjusting the coded near end signal may be done in accordance with the techniques described above.

FIG. 4B is a detailed flow diagram 440 of an echo control module 450 (see FIG. 4C) that may be used according to an example embodiment of the invention. This module takes as input sequential encoded echo signal (near end) frames 453a as well as encoded reference signal (far end) frames 452. Each near end and far end signal frame is dequantized (444 for near end and 456 for far end). Subsequently, the dequantized parameters are used to compute various relevant spectral information or related features that may be used to form (451 for near end and 464 for far end) a frame feature vector (451 a for near end and 468 for far end). Feature vectors may include a variety of parameters, such as cepstral coefficients, delta cepstrals, and/or delta-delta cepstrals. Feature vector elements may be obtained using available feature extraction methods in the art. In this embodiment, the cepstral coefficients are computed directly from coded parameters by transforming line spectral pairs into cepstral coefficients. Cepstral coefficients are obtained via $$c(t)=F^{-1}(\log(F(x(t))),$$

where c(t) is the cepstral coefficient, F is the Fourier operator, $F^{-1}$ is the inverse Fourier operator, and x(t) is the dequantized speech signal. Additionally, the dequantized parameters may be at least partially decoded 475 and used to compute frame energy (451 for near end and 464 for far end). This frame energy may also included within the frame feature vector.

The procedure described in the above paragraph applies to both near end and far end signals.

The far end signal frame feature vector 464 is then inserted into a delay line buffer 466. The delay line buffer of L bins is maintained to store the feature vectors of the previous L frames of the far-end signal. The value of L depends on the largest echo path delay that is to be expected. This delay buffer 466 facilitates the computation 455 of similarity functions based on the current near end feature vector and a delayed far end feature vector.

The near end frame feature vector 451a and the delayed far end frame feature vector 468 then enter a module responsible for computing the set of similarity functions 455. As described previously, the similarity function 457 is defined by employing weighted cepstral correlations between the current frame of the near-end signal and a delayed frame of the far-end signal:

$$f(Y_m, X_{m-i})=|X_{m-i}|r(Y_m, X_{m-i}),$$

where $Y_m$ is the feature vector for the current frame, m of the near-end signal, $X_{m-i}$ is the feature vector for frame m−i, i≧0, of the far-end signal, and $r(Y_m, X_{m-i})$ is the correlation coefficient between $Y_m$ and $X_{m-i}$. If an audible echo is present in the near-end signal, then the similarity function between a frame of the near-end signal and the frame in the delay line bin corresponding to the actual echo path delay will consistently exhibit a larger value compared to the other similarity function values for the rest of the delay line bins. A short or long term average of $f(Y_m, X_{m-i})$ across the index m, when plotted as a function of the index i, $1 \leq i \leq L$, exhibits a peak at the index corresponding to the echo path delay.

Continuing to refer to the example embodiment of FIG. 4B, there are three modules that make use of the calculated similarity functions, namely: a module responsible for computing smoothened similarity functions 472, module responsible for updating the delay histogram 474, and module responsible for normalizing similarity functions 477.

A new normalized similarity function is obtained by cohort normalizing (477) of the similarity functions 457 obtained in the module responsible for calculating the similarity function 455. The normalization is performed as follows:

$$g(Y_m, X_{m-i}) = f(Y_m, X_{m-i}) - f(Y_m, X_{m-j}), 1 \leq i \leq L,$$
where
$$j = \arg\max_i f(Y_m, X_{m-i}), 1 \leq i \leq L.$$

The cohort score is the maximum value of the similarity functions 457 over all the delay bins for a given near-end signal frame.

The module for computing smoothened similarity functions 472 then calculates the smoothened version of similarity functions 457. Smoothing may be performed by employing any available smoothing methods in the literature.

In order to further reduce the variance of $g(Y_m, X_{m-i})$ during echo segments, a module configured for normalizing smoothened similarity functions 479 calculates the normalized version of the smoothened $f(Y_m, X_{m-i})$. Notationally, the normalized smoothened similarity functions are obtained using:

$$g_s(Y_m, X_{m-i}) = f_s(Y_m, X_{m-i}) - f_s(Y_m, X_{m-k}), 1 \leq i \leq L,$$
where
$$f_s(Y_m, X_{m-i}) = \alpha f_s(Y_m, X_{m-i}) + (1-\alpha)f(Y_m, X_{m-i}),$$
$$k = \arg\max_i f_s(Y_m, X_{m-i}), 1 \leq i \leq L.$$

In this embodiment, $\alpha$ is a constant set to 0.9.

A module responsible for updating the delay histogram 474 takes as an input a set of computed similarity functions 457 and estimates the echo path delay index by applying a ranked statistics-type approach. For a given call, the history of echo delays is considered by maintaining a histogram of the delay indices that maximize the frame's $f(Y_m, X_{m-i})$. However, instead of incrementing the histogram bin by 1, the bin may be incremented by a weighted value of the maximum similarity function:

$$H_m(j) = H_{m-i}(j) + \lambda f(Y_m, X_{m-j})$$

where j is given in equation (4), $H_m(j)$, $1 \leq j \leq L$, is the state of the histogram at frame m, and $\lambda$ is a constant set to 10. Therefore, the histogram may be biased towards the indices associated with larger maximums of $f(Y_m, X_{m-j})$.

The module for estimating echo path delay 482 then estimates the echo path delay index for frame m, and the echo path delay index is then estimated as $$i_m^* = \arg\max_i H_m(i), 1 \leq i \leq L.$$

The corresponding echo path delay can then be given as:

$$\hat{d}_m = D \cdot i_m^*$$

where D is the frame duration.

Echo detection is then performed by comparing the normalized similarity function at the estimated echo path delay $g(Y_m, X_{m-i})$ to a threshold (module 485). Similarly the smoothened normalized similarity function at the estimated echo path delay $g_s(Y_m, X_{m-i})$ is compared to its own respective threshold (module 487). Note that, index i in $g(Y_m, X_{m-i})$ and is $g_s(Y_m, X_{m-i})$ set equal to the index corresponding to an estimated echo path delay.

Module 490 is responsible for calculating the ratio of the echo signal frame energy to the reference signal frame energy and comparing this ratio to its respective threshold level.

The example embodiment of FIG. 4B determines the presence or absence of an echo case by considering the results obtained from modules 485, 487, and 490. If no echo is detected 493, flow diagram 440 sends the near end frame without further modification. In cases where an echo is detected 492, the system replaces the near end frame by choosing at random a frame from the buffer and replacing the parameters of the echo frame with parameters of the randomly chosen background noise frame.

Figure 4C:
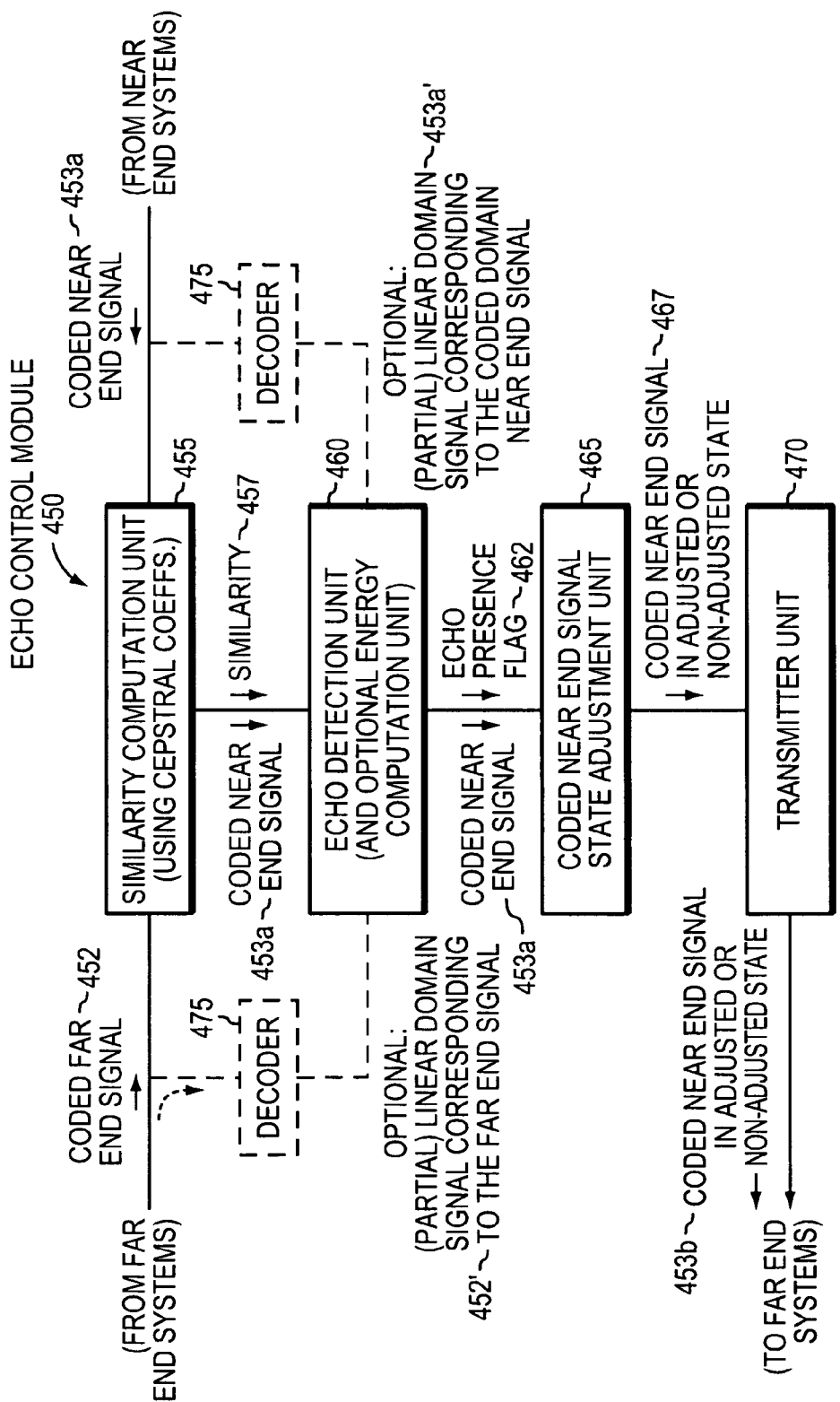

FIG. 4C is a block diagram of an echo control module 450 that may be used in an example embodiment of the invention to control echo in a coded near end signal 453*a*. The echo control module 450 includes four units, including: a similarity computation unit 455, echo detection unit 460, state adjustment unit 465, and transmitter unit 470. The similarity computation unit 455 uses cepstral coefficients to determine similarity 457 of a coded far end signal 452 and coded near end signal 453*a*. The echo detection unit 460 uses the similarity 453 to determine whether echo is present in the coded near end signal 453*a*. If there is echo, the echo detection unit 460 sets an echo presence flag 462. The coded near end signal state adjustment unit 465 adjusts a state of the coded near end signal 453*a* to control echo, optionally by replacing frames having echo with frames containing comfort noise, as described above, or just replacing applicable coded parameters in the existing frames. The coded near end signal state adjustment unit 465 then sends the coded near end signal in an adjusted or non-adjusted state 467 to the transmitter unit, which, in turn, transmits the coded near end signal in an adjusted or non-adjusted state 453*b*.

In an alternative embodiment, the echo control module 450 also includes decoders 475 to decode the coded far end signal 452 and coded near end signal 453*a* to produce partially or fully decoded linear domain signals 452 and 453*a* to provide to the echo detection unit 460, which may optionally include an energy computation unit (not shown) to use to enhance the echo detection unit's 460 ability to detect echo based on logic with respect to energy in frames, where the energy can be used to determine whether or not an echo is contained in the frame.

Experimental Results

A system was set up where actual echoes over a commercial 2G mobile network can be recorded. The system enabled an audio file to be played to a mobile handset over an actual call within the network. We chose, at random, six sentences spoken by a female speaker and concatenated them with a period of silence after each sentence. Any echo suppression within the network was turned off. However, any possible echo suppression in the mobile handset itself was still active. We then recorded any echoes that returned from the mobile handset operating in non speaker-phone mode. The echoes arrived at our recording station as G.711 encoded signals. In this setup, the recorded echoes are purely acoustic.

To generate different echo conditions, we scaled the recorded echo to a desired level and shifted it to a predetermined echo path delay. We then mixed it with noise to simulate a typical near-end signal. Finally, to generate the coded signals, we encoded the constructed near-end signal and the original far-end signal that was played through our system. In our experiments, we used the EVRC codec.

We compared the normalized similarity function, $g(Y_m, X_{m-i})$ to $f(Y_m, X_{m-i})$. The far-end signal level was set to −17 dBm, and the Echo Return Loss (ERL) in the near-end signal was 25 dB. The echo path delay was set at 175 msec. The near-end signal was constructed by mixing the echo signal with car highway noise at varying Echo-to-Noise ratio (ENR). As a baseline to see how well the similarity function discriminated between true echo and non-echo, we also included a case where the echo signal belonged to a different far-end signal.

Figure 5:
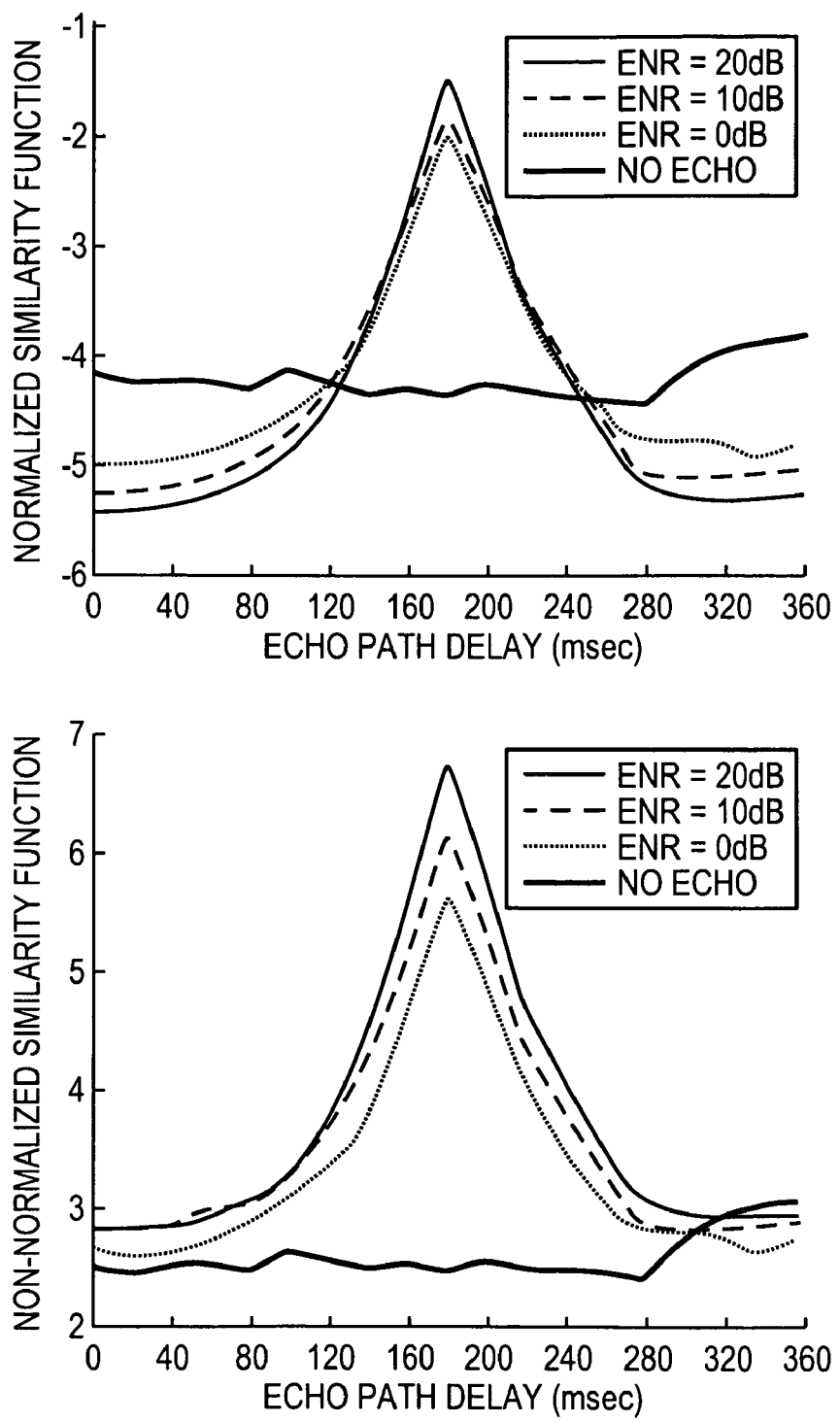
FIGS. 5-7 are plots illustrating analysis in an experiment conducted employing an embodiment of the present invention.
Figure 6:
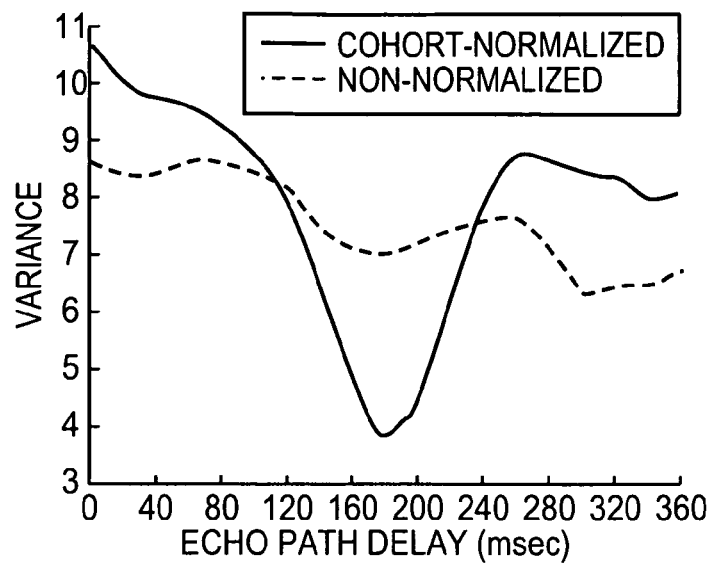

FIG. 5 shows $g(Y_m, X_{m-i})$ and $f(Y_m, X_{m-i})$ versus echo path delay. The value of the similarity function at any given delay in FIG. 5 represents its mean value over the 6-sentence utterance. However, to remove the bias caused by including silence segments in the averaging process, we excluded such segments from the mean computation. We did that by excluding $1/8^{th}$ rate frames from the averaging process. FIG. 5 shows that despite the fact that the echoes have non-linear components due to codec effects and acoustic coupling, both $g(Y_m, X_{m-i})$ and $f(Y_m, X_{m-i})$ give a very good indication of the existence of the echo at the correct echo path delay, even at low ENR. Furthermore, both similarity functions can discriminate well between echo cases and the baseline non-echo case. However, note that the peak values at the different ENR's for $g(Y_m, X_{m-i})$ are closer together compared to $f(Y_m, X_{m-i})$. This suggests that the variance of $g(Y_m, X_{m-i})$ at the correct echo path delay is smaller than that of $f(Y_m, X_{m-i})$, an attractive property for a robust echo control system. To see this, we compare in FIG. 6 the variance of $g(Y_m, X_{m-i})$ and $f(Y_m, X_{m-i})$ across the different ENR cases of FIG. 5. Here we observe that, indeed, $g(Y_m, X_{m-i})$ results in a much lower variance at the correct echo path delay compared with $f(Y_m, X_{m-i})$ and also compared with other delay values. This makes $g(Y_m, X_{m-i})$ a more robust similarity function for echo detection.

Figure 7:
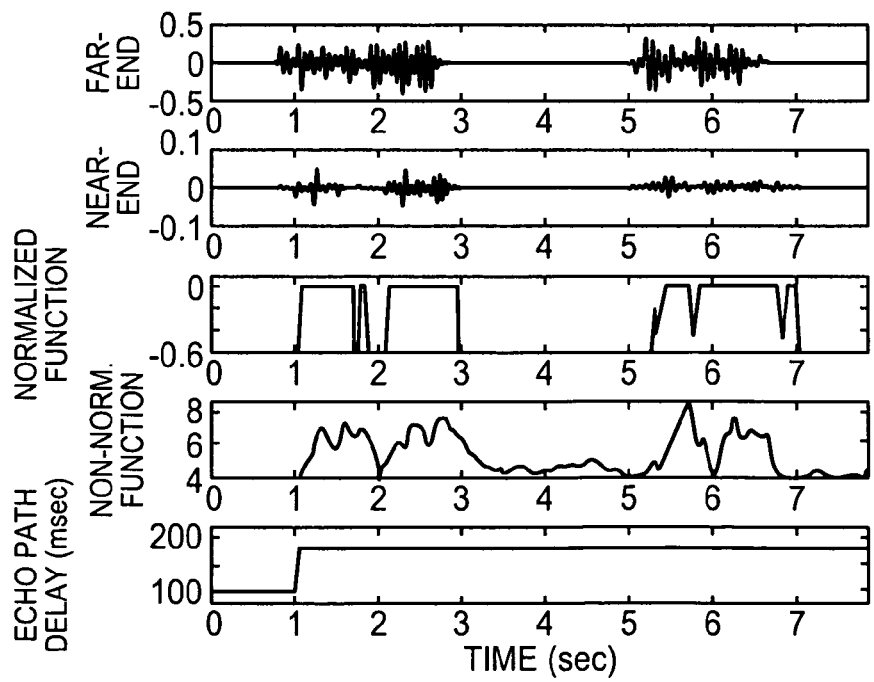

FIG. 7 shows the results for an example far-end signal consisting of two sentences. The top plot shows the decoded far-end signal, while the second plot shows the decoded near-end signal which was constructed, prior to encoding, by mixing the following two signals: 1) the far-end returned echo signal scaled and shifted to 25 dB ERL and 175 msec. delay, 2) near-end car noise at Echo-to-Noise ratio of 10 dB. The third and fourth plots compare the normalized similarity function, $g_s(Y_m, X_{m-i})$ with $f_s(Y_m, X_{m-i})$. Both of these functions are plotted with i set to the estimated echo path delay index as given in equation (9). As expected, we see that $g_s(Y_m, X_{m-i})$ is a more consistent measure across the echo segments. It is interesting to note that the echo in a section around the middle of the first sentence disappears for a few frames. This may be due to the echo suppression in the handset itself. Nevertheless, $g_s(Y_m, X_{m-i})$ is able to pick up these quick transitions well. The last plot in FIG. 7 shows the estimated echo path delay. We note that the correct echo path delay is estimated correctly once the first echo had occurred. For comparison, we also processed the decoded far-end and near-end signals of FIG. 7 using a state-of-the-art NLMS-based echo cancellation algorithm that fully meets the ITU-T G.168 recommendation. We turned its Non-Linear Processor (NLP) off to determine the pure performance of an NLMS adaptive filter. We obtained an Echo Return Loss Enhancement (ERLE) of only 1.4 dB underscoring the need for acoustic echo control in mobile networks.

The coded-domain acoustic echo control provided in this invention employs a perceptual matching approach based on the spectral information already present in the encoded signal bit stream. A normalized similarity function is defined for echo detection and is shown to be robust against different conditions. Echo path delay is estimated using a ranked statistics-type approach. Echo control is then performed by replacing frames classified as having echo with spectrally matched comfort noise frames. Experimental results show that the similarity function is effective at reliably detecting echo segments and the echo path delay is correctly estimated after the first echo frame is seen.

While this invention has been particularly shown and described with references to example embodiments thereof, it will be understood by those skilled in the art that various changes in form and details may be made therein without departing from the scope of the invention encompassed by the appended claims.

What is claimed is:

1. A method of controlling echo in the coded domain, comprising:
   computing similarity of coded near end and far end signals as a function of cepstral coefficients;
   computing the cepstral coefficients directly from coded parameters by transforming line spectral pairs into cepstral coefficients;
   detecting echo based on the similarity; and
   transmitting the coded near end signal in an adjusted state in an event echo is detected in the near end signal.

2. The method according to claim 1 wherein computing the similarity includes:
   computing a present set of similarity functions as a function of a present coded near end signal frame and present and previous coded far end signal frames;
   computing a present set of normalized similarity functions as a function of the similarity functions;
   computing a present set of smoothened similarity functions as a function of the similarity functions;
   computing a present set of normalized smoothened similarity functions as a function of the smoothened similarity functions; and
   wherein detecting the echo includes:
      determining a delay of a possible echo in the present coded near end speech frame based on the present and previous sets of similarity functions; and
      comparing a given present normalized similarity function corresponding to the delay to a first threshold and a given present normalized smoothened similarity function corresponding to the delay to a second threshold to determine whether the present coded near end signal frame contains echo.

3. The method according to claim 2 wherein computing the set of similarity functions include employing weighted cepstral correlations between the present near end signal frame and a present and previous far end signal frames.

4. The method according to claim 2 wherein computing the present set of normalized similarity functions includes:
   determining the maximum valued similarity function among the present set of similarity functions; and
   normalizing the present set of similarity functions based on the maximum value of the similarity functions.

5. The method according to claim 2 wherein computing the present set of smoothened similarity functions includes:
   calculating a present smoothened similarity function by computing a weighted sum of previous smoothened similarity functions and a present similarity function.

6. The method according to claim 2 wherein computing the present set of normalized smoothened similarity functions includes:
   determining a maximum valued smoothened similarity function among the present set of smoothened similarity functions; and
   normalizing the present set of smoothened similarity functions based on the maximum value of the smoothened similarity functions.

7. The method according to claim 2 wherein determining whether the present coded near end signal frame includes echo includes comparing the present set of normalized similarity functions and the normalized, smoothened, similarity functions to respective thresholds at an index of the functions corresponding to an estimated echo path delay.

8. The method according to claim 2 wherein detecting echo includes:
   estimating an echo path delay index by maintaining a histogram of delay indices
   that maximize a similarity function representing a frame within the coded near end and far end signals;
   incrementing bins within the histogram by a weighted value of a maximum similarity function to bias the histogram towards indices associated with larger maximums of the similarity function; and
   reporting an estimated echo path delay based on the histogram index whose bin has the largest value.

9. The method according to claim 1 further including:
   at least partially decoding the near end and far end signals;
   determining a state of energy loss based on whether the near end signal is within an expected energy loss compared to energy of the far end signal associated with echo; and
   wherein detecting the echo includes using the state of energy loss and the similarity to detect the echo more accurately than using the similarity alone.

10. A method of controlling echo in the coded domain, comprising:
    computing similarity of coded near end and far end signals as a function of cepstral coefficients;
    detecting echo based on the similarity;
    transmitting the coded near end signal in an adjusted state in an event echo is detected in the near end signal; and
    replacing parameters of frames in the coded near end signal detected to contain echo with the parameters in a state that reduces or removes the echo.

11. A method of controlling echo in the coded domain, comprising:
    computing similarity of coded near end and far end signals as a function of cepstral coefficients;
    detecting echo based on the similarity;
    transmitting the coded near end signal in an adjusted state in an event echo is detected in the near end signal; and
    replacing parameters of frames in the coded near end signal detected to contain echo with the parameters in a state of comfort noise.

12. The method according to claim 1 wherein, in an Enhanced Variable Rate Coded (EVRC) system, the method further comprises:
    replacing a frame detected to have echo with a frame randomly chosen from among previously detected and stored ⅛ rate encoded frames; and
    in an event the frame detected with echo follows a frame encoded at full rate, further including:
    dequantizing a randomly chosen previously detected and stored ⅛ rate encoded frame;
    requantizing the dequantized frame as a requantized ½ rate encoded frame; and
    replacing the frame detected with echo with the requantized ½ rate encoded frame.

13. An apparatus for controlling echo in the coded domain, comprising:
    a similarity computation unit to compute similarity of coded near end and far end signals as a function of cepstral coefficients;
    a computation unit to compute the cepstral coefficients directly from coded parameters as a function of transformation of line spectral pairs into cepstral coefficients;
    an echo detection unit to detect echo based on the similarity; and
    a transmitter unit to transmit the coded near end signal in an adjusted state in an event echo is detected in the near end signal.

14. The apparatus according to claim 13 wherein the similarity computation unit is further configured to compute the similarity as a function of:
    a present set of similarity functions computed as a function of a present coded near end signal frame and present and previous coded far end signal frames;
    a present set of normalized similarity functions computed as a function of the similarity functions;
    a present set of smoothened similarity functions computed as a function of the similarity functions;
    a present set of normalized smoothened similarity functions computed as a function of the smoothened similarity functions; and
    wherein the echo detection unit is further configured to detect the echo as a function of:
    a delay of a possible echo in the present coded near end speech frame determined based on the present and previous sets of similarity functions; and
    comparison of a given present normalized similarity function corresponding to the delay to a first threshold and a given present normalized smoothened similarity function corresponding to the delay to a second threshold to determine whether the present coded near end signal frame contains echo.

15. The apparatus according to claim 14 wherein similarity computation unit is further configured to compute the set of similarity functions as a function of weighted cepstral correlations between the present near end signal frame and a present and previous far end signal frames.

16. The apparatus according to claim 14 wherein similarity computation unit is further configured to compute the present set of normalized similarity functions as a function of:
    the maximum valued similarity function determined among the present set of similarity functions; and
    the present set of similarity functions normalized based on the maximum value of the similarity functions.

17. The apparatus according to claim 14 wherein the similarity computation unit is further configured to compute the present set of smoothened similarity functions as a function of:
  a present smoothened similarity function calculated through computation of a weighted sum of previous smoothened similarity functions and a present similarity function.

18. The apparatus according to claim 14 wherein the similarity computation unit is further configured to compute the present set of normalized smoothened similarity functions as a function of:
  a maximum valued smoothened similarity function determined among the present set of smoothened similarity functions; and
  the present set of smoothened similarity functions normalized based on the maximum value of the smoothened similarity functions.

19. The apparatus according to claim 14 wherein the echo detection unit includes:
  a computation unit to compare the present set of normalized similarity functions and the normalized, smoothened, similarity functions to respective thresholds at an index of the functions corresponding to an estimated echo path delay; and
  a determination unit to determine whether the present coded near end signal frame includes echo based on a result by the comparison unit.

20. The apparatus according to claim 14 wherein the echo detection unit includes:
  an echo path delay index estimation unit to estimate an echo path delay index by maintaining a histogram of delay indices that maximize a similarity function representing a frame within the coded near end and far end signals;
  a biasing unit that increments bins within the histogram by a weighted value of a maximum similarity function to bias the histogram towards indices associated with larger maximums of the similarity function; and
  a reporting unit that reports an estimated echo path delay based on the histogram index whose bin has the largest value.

21. The apparatus according to claim 13 further comprising:
  a decoder to at least partially decode the near end and far end signals;
  an energy state determination unit to determine a state of energy loss based on whether the near end signal is within an expected energy loss compared to energy of the far end signal associated with echo; and
  wherein the echo detection unit is configured to use the state of energy loss and the similarity to detect the echo more accurately than using the similarity alone.

22. An apparatus for controlling echo in the coded domain, comprising:
  a similarity computation unit to compute similarity of coded near end and far end signals as a function of cepstral coefficients;
  an echo detection unit to detect echo based on the similarity;
  a transmitter unit to transmit the coded near end signal in an adjusted state in an event echo is detected in the near end signal; and
  the transmitter unit includes a parameter replacement unit to replace the parameters of frames in the coded near end signal detected to contain echo with the parameters in a state that reduces or removes the echo.

23. An apparatus for controlling echo in the coded domain, comprising:
  a similarity computation unit to compute similarity of coded near end and far end signals as a function of cepstral coefficients;
  an echo detection unit to detect echo based on the similarity;
  a transmitter unit to transmit the coded near end signal in an adjusted state in an event echo is detected in the near end signal; and
  the transmitter unit includes a parameter replacement unit arranged to replace parameters of frames in the coded near end signal, detected to contain echo, with the parameters in a state of comfort noise.

24. The apparatus according to claim 13 wherein, in an Enhanced Variable Rate Coded (EVRC) system, the apparatus further comprises:
  a first frame replacement unit to replace a frame detected to have echo with a frame randomly chosen from among previously detected and stored 1/8 rate encoded frames; and
  a second frame replacement unit configured to be activated in an event the frame detected with echo follows a frame encoded at full rate, the second frame replacement unit including:
  a dequantizer to dequantize a randomly chosen previously detected and stored 1/8 rate encoded frame;
  a requantizer to requantize the dequantized frame as a requantized 1/2 rate encoded frame; and
  a frame replacement unit to replace the frame detected with echo with the requantized 1/8 rate encoded frame.

25. A computer program product comprising a non-transitory computer usable medium having computer readable code stored thereon, which, when executed a processor, causes the processor to:
  compute similarity of coded near end and far end signals as a function of cepstral coefficients;
  compute the cepstral coefficients directly from coded parameters by transforming line spectral pairs in cepstral coefficients;
  detect echo based on the similarity; and
  transmit the coded near end signal in an adjusted state in an event echo is detected in the near end signal.

* * * * *